J. T. SWAIN.
TARGET TRAP.
APPLICATION FILED APR. 10, 1911.

1,017,272.

Patented Feb. 13, 1912.

2 SHEETS—SHEET 1.

Witnesses

Inventor
J. T. Swain,
By D. Swift &Co.
Attorneys

J. T. SWAIN.
TARGET TRAP.
APPLICATION FILED APR. 10, 1911.
1,017,272.
Patented Feb. 13, 1912.
2 SHEETS—SHEET 2.
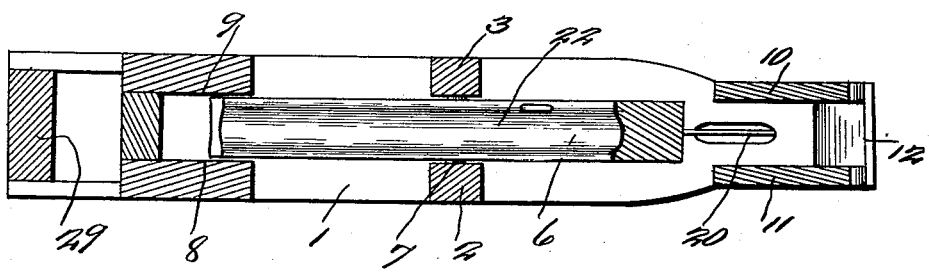
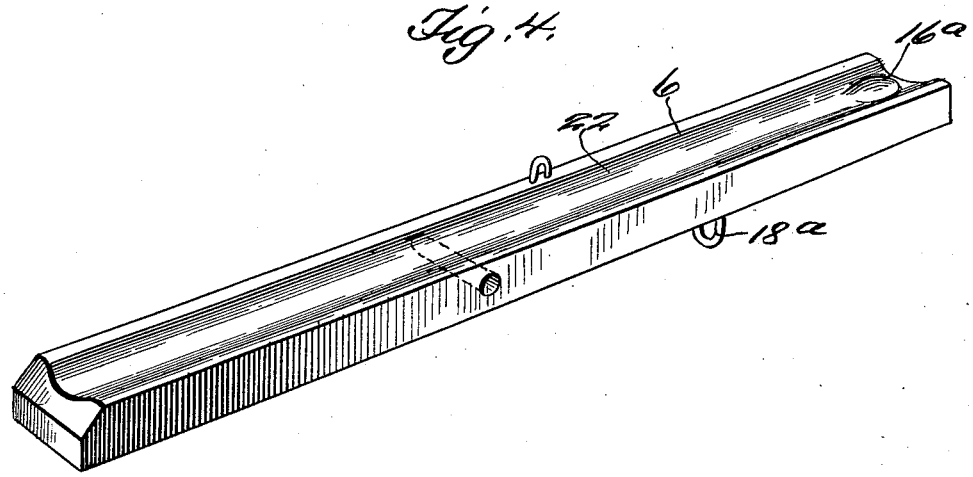
Witnesses
Inventor
J. T. Swain,
By D. Swift &Co.
Attorneys

UNITED STATES PATENT OFFICE.

JOHN T. SWAIN, OF PRENTICE, ILLINOIS.

TARGET-TRAP.

1,017,272.  Specification of Letters Patent.  Patented Feb. 13, 1912.

Application filed April 10, 1911. Serial No. 620,106.

*To all whom it may concern:*

Be it known that I, JOHN T. SWAIN, a citizen of the United States, residing at Prentice, in the county of Morgan and State of Illinois, have invented a new and useful Target-Trap; and I do hereby declare the following to be a full, clear, and exact description of the invention, such as will enable others skilled in the art to which it appertains to make and use the same.

The invention relates to a target trap and has for its object to provide an improved structure of this character adapted to thrust a round ball vertically, thus affording a suitable target for rifle practice.

One of the objects of the invention is to provide a target trap of this character adapted to automatically feed a ball or target into the trap when the trap is set.

Another object of the invention is to improve the construction and simplify the mechanism and improve the efficiency generally.

With these and other objects in view, the invention consists in the novel construction and arrangement of parts hereinafter described and shown, and particularly pointed out in the appended claim.

Figure 1:
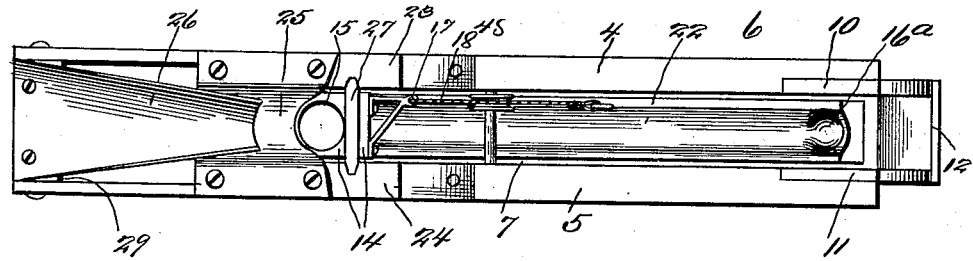
Figure 2:
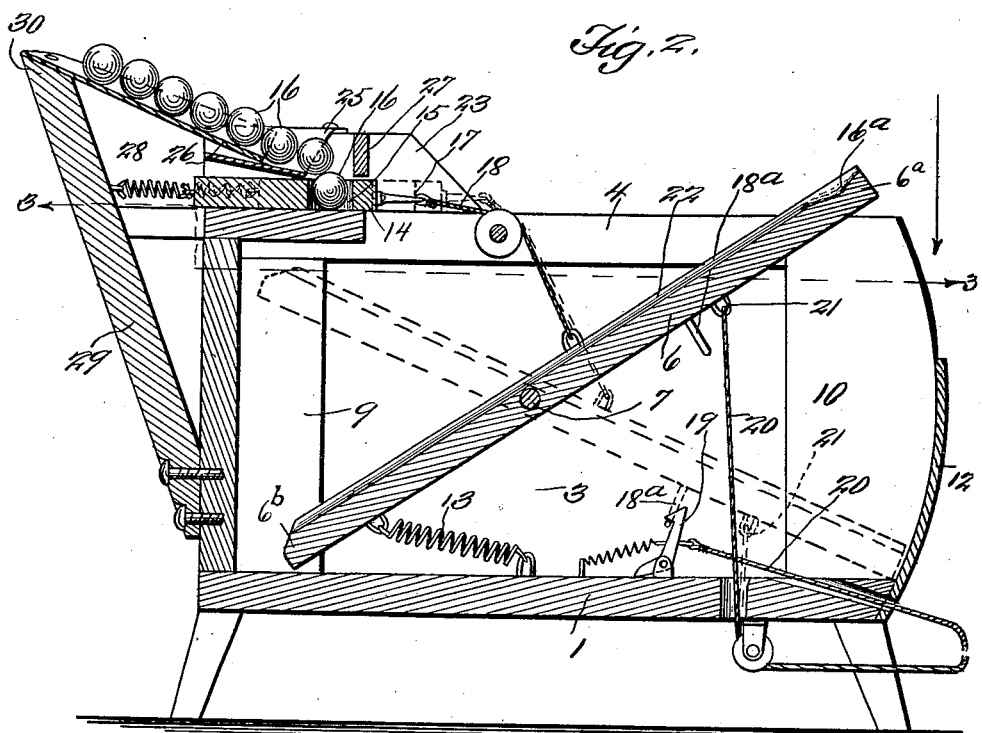

In the drawings:—Figure 1 is a top plan view of a trap constructed in accordance with this invention. Fig. 2 is a vertical sectional view. Fig. 3 is a transverse sectional view through the guide. Fig. 4 is a detailed perspective view of the thrust bar.

Referring to the drawings, 1 designates the bottom member of the trap which is provided with a pair of centrally disposed vertical posts 2 and 3 which support horizontally disposed top members 4 and 5.

The thrust bar 6 is pivoted as at 7 between the vertical posts or supports 2 and 3. The inner end of the bar 6 is disposed between guides 8 and 9. The outer end of the bar 6 is disposed between said members 10 and 11 and a transverse member 12 which form a pocket when the outer end of the thrust bar is pressed downward, that is, when the trap is set.

As the outer end of the bar 6 is pressed downwardly, against the tension of the spring 13, the reciprocating member 14 is moved forwardly to the aperture 15, draws one of the balls 16 on to the thrust bar 6 which guides it to the outer end of the same and into a depression $16^a$. The reciprocating member 14 is provided with an eye 17 with which a cable 18 is connected, which also connects with the bar 6.

When the outer end of the bar 6 is depressed, the U-shaped member $18^a$ is engaged by a catch 19, which is secured to the member or bottom piece 1. The catch 19 is connected with one end of a cable 20, the other end of which is connected with the outer or movable end of the thrust bar 6, as shown at 21, so that the trap is raised by pulling one end of the cord or cable 20, which is drawn against the outer end of the bar 6, thereby depressing the same. The catch 19 has an aperture which releases the thrust bar thereby thrusting the ball or target upwardly. The thrust bar 6 is provided with a longitudinal guide way or depression 22 which guides the balls into the depression $16^a$, as they automatically fall upon the said thrust bar.

The upper part of the trap is provided with side members 23 and 24 across which a depressed piece of sheet metal 25 is disposed, which engages the lower end 26 of a trough. This trough 26 is designed to hold a number of balls and as the space between the member 25 and a transverse member 27 is only wide enough to take one ball at a time, it will be seen that as the reciprocating member returns to its initial position, a ball will automatically drop into the aperture 15, ready to be carried to its place in the depression $16^a$ when the trap is sprung for the next discharge. The reciprocating member 14 is held in its normal position by a spring 28 which is connected with the rear member 29, the upper end 30 of which is connected with the trough 26.

The operation of the device is as follows. Assuming that the trap is in the position shown in Fig. 2, the end $6^a$ of the bar 6 is drawn downwardly by pulling the cable 20, until the bar 6 assumes the position shown in dotted lines. When the bar 6 is thus moved the cable 18 will draw the reciprocating member 14 inwardly until the aperture 15 is clear of its support, when one of the balls drops through the aperture on to the end $6^b$ of the bar 6. At this point the end $6^b$ being upwardly disposed the ball rolls downwardly until it reaches the depression $16^a$ in the other end. The trap is now sprung and the catch 19 engages the U-shaped member $18^a$. The catch 19 is now disengaged from the U-shaped member 18ª which renders the bar 6 free to move on the pivot 7 so that the contraction of the spring 13 causes the end 6ª to thrust the ball upwardly at which point the parts assume again the position shown in Fig. 2.

Having thus described the invention, what is claimed is:

In a target trap of the class described, a frame, a pair of vertically disposed, centrally arranged posts, a thrust bar pivoted between said posts, said thrust bar being spring-actuated, a catch disposed in the lower part of said frame, and adapted to engage a U-shaped member on said thrust bar, each end of the trap having guideways, each end of said thrust bar being adapted to engage a guideway.

In testimony whereof I have signed my name to this specification in the presence of two subscribing witnesses.

JOHN T. SWAIN.

Witnesses:
  CARMI G. CANTRELL,
  FELIX WALSH.

---

Copies of this patent may be obtained for five cents each, by addressing the "Commissioner of Patents, Washington, D. C."